(No Model.)
F. A. HINDS.
DEVICE FOR OPERATING VALVES.
No. 339,888. Patented Apr. 13, 1886.
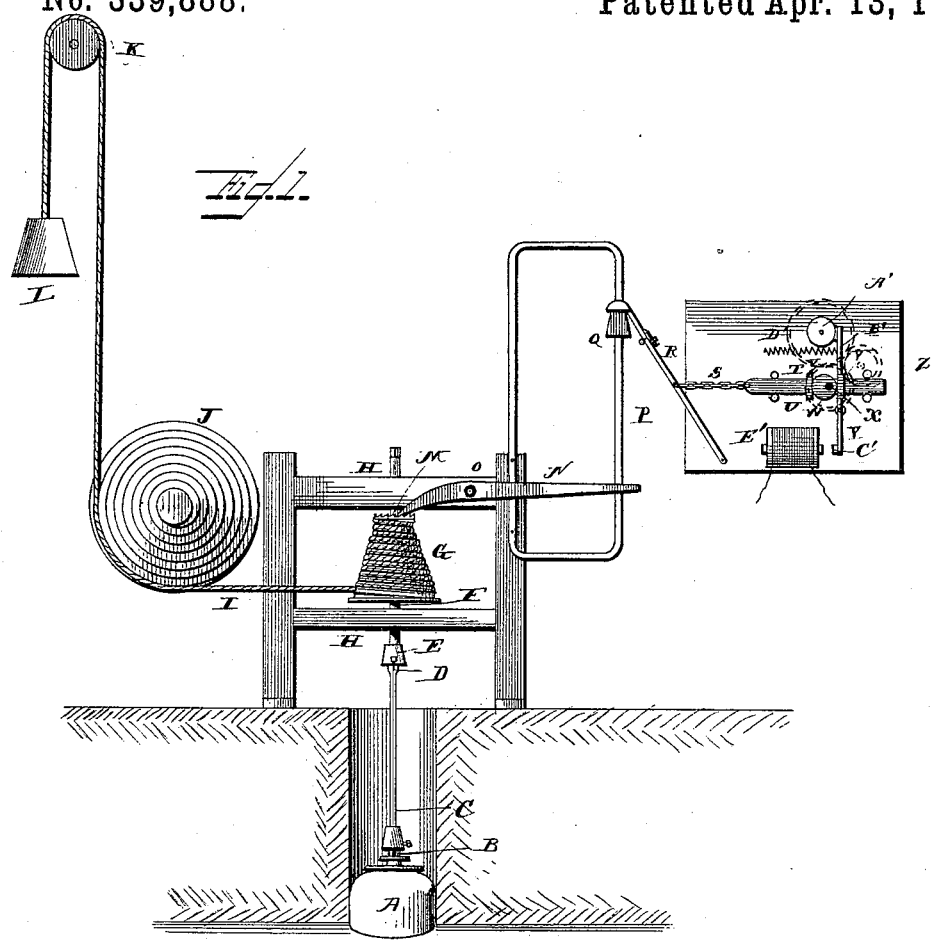
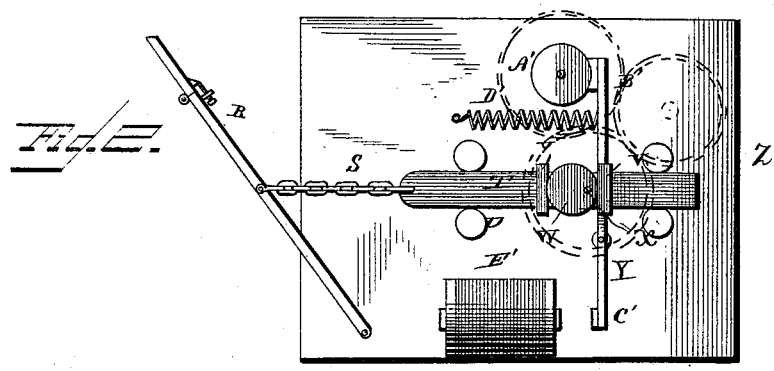
WITNESSES
F. L. Ourand
Edward Stanton
INVENTOR,
Frank A. Hinds,
By Louis Bagger & Co,
Attorneys.

UNITED STATES PATENT OFFICE.

FRANK A. HINDS, OF WATERTOWN, NEW YORK, ASSIGNOR TO HINDS, MOFFETT & CO., OF SAME PLACE.

DEVICE FOR OPERATING VALVES.

SPECIFICATION forming part of Letters Patent No. 339,888, dated April 13, 1886.

Application filed October 24, 1885. Serial No. 180,846. (No model.)

*To all whom it may concern:*

Be it known that I, FRANK A. HINDS, of Watertown, in the county of Jefferson and State of New York, have invented certain new and useful Improvements in Devices for Closing the Gates or Valves in Water-Pipes; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view, partly in section, of my improved apparatus for closing a gate or valve of a water-main from a distance; and Fig. 2 is a view on an enlarged scale of the apparatus which releases the dog which holds the closing apparatus.

Similar letters of reference indicate corresponding parts in both the figures.

My invention has relation to apparatus for closing a gate or valve of a water-main from a distance; and it consists in the improved construction and combination of parts of such an apparatus where the gate is closed by means of a weighted rope operating a drum, which is released by an apparatus having suitable dogs and means for releasing them, the dog which starts the releasing apparatus being operated by breaking or closing an electric current, as hereinafter more fully described and claimed.

In the accompanying drawings, the letter A indicates the gate of a water-main, which gate is provided at its top with a square nut, B, upon which fits the lower end of a wrench or socketed rod, C, which extends to the surface of the ground, and is formed at its upper end into a square or polygonal head, D. The lower socketed end, E, of a vertical shaft, F, fits upon this head, and a drum, G, is secured upon this shaft, which is journaled in suitable bearings, H. A rope or chain, I, is wound upon the drum and passes under a guide-pulley, J, up over an elevated pulley, K, and is provided with a weight or poise, L, which is of sufficient weight to turn the drum and close the gate when the poise is allowed to descend. The surface of the drum G is cut in screw-grooves to guide the rope or chain, and one end of the drum is enlarged, so as to give the poise a greater power with which to start the drum in motion, but after being once started the momentum of the drum will assist the diminishing power of the poise to continue the motion until the gate is closed. The guide-pulley J is also made in the shape of a conical drum with a screw-groove, and guides the rope into the grooves of the drum G. The top of the drum G is provided with a ratchet-rim, M, which is engaged by a pawl-lever, N, pivoted upon the supporting-frame O of the drum, and this pawl-lever prevents the drum from being turned by the weight of the poise. The outer end of this pawl-lever projects at the side of a vertical rod, P, secured upon the supporting-frame, and a poise, Q, slides upon this vertical rod, and may in descending strike the free outer end of the lever. A rule-jointed prop, R, supports this sliding poise and is pivoted at its lower end, and a chain, S, is attached to this prop near the rule-joint and attached at its other end to a sliding bolt, T, which slides in a horizontal plane within a suitable casing, U. This sliding bolt is formed with two outwardly-projecting lugs or blocks, V V, between which an eccentric disk, W, fits, so that the disk when revolved may reciprocate the bolt, and this disk is secured upon a shaft, X, suitably connected to the train Y of a clock-work, Z, actuated by a suitable spring or weight, which is provided at the other end of the train with a friction-wheel, A', which is engaged and held by a brake on the upper end of the lever B', which is pivoted near its middle and provided with an armature, C, at its lower end, while its upper end is drawn to engage and hold the friction-wheel by a spring, D'. The armature is placed at the ends of magnets E upon a circuit having a key or other means for closing a circuit at the point from which the closing of the gate is desired to take place. It will now be seen that when the normally-open circuit is closed the armature upon the lower end of the lever B' will be attracted, which will cause it to release the friction-wheel, which again will allow the train of clock-wheels to move, revolving the eccentric disk, so that it will be drawn from the rule-jointed prop, and by drawing upon its chain double up or collapse the said prop. This will allow the sliding poise to fall upon its vertical rod, striking the free end of the pawl-lever, which will release the drum, allowing the poise to turn the drum by means of the rope, which will close the gate or valve. In this manner the gate of a water-main may be closed in a moment of time from the pump-house, engineer's office, or any other place at the water-works, or from any other desirable place where a key may be placed upon the circuit. This will enable the party closing the gate or valve to accomplish this without sending a person so long a distance to the place, losing the time and causing expense, and in a system where the ordinary domestic service is from a reservoir, but where it is desirable to give direct pressure from the pumps by closing the inlet to the reservoir, this device is particularly useful. In such a system the inlet to the reservoir must be immediately closed upon short notice—as, for instance, in the case of a fire—and where the gate closing the inlet to the reservoir is a great distance from the pump-house the necessity for closing the inlet may have passed away by the time that a man might reach it and close it.

It follows that slight changes may be made in this apparatus, the principle of the invention being a device operated by electricity and serving to release the means for closing the gate. It may also be applied to other than water-mains—such as gas and oil pipes, &c., well-known means for accomplishing this object being capable of being substituted at several places of the apparatus without departing from the spirit of my invention, and various changes being possible in the apparatus without changing the spirit or principle of the invention.

Having thus described my invention, I claim and desire to secure by Letters Patent of the United States—

1. In an apparatus for closing gates or valves of water-mains, the combination of the sliding poise for releasing the gate-opening drum, a rule-jointed prop supporting the poise and pivoted at its lower end, a horizontally-sliding bolt having a chain attached to one end and to the prop near its joint and provided with two outwardly-projecting lugs or blocks, an eccentric disk journaled to fit between the lugs, a train of clock-wheels carrying the eccentric disk, a brake-wheel upon the said train of clock-wheels, a lever engaging the said brake-wheel and having an armature at its lower end, and a pair of magnets provided with suitable means upon their circuit for breaking or closing the circuit, as and for the purpose shown and set forth.

2. In combination with the gate-closing drum and the pawl-lever holding the said drum, the vertically-sliding poise for striking the free end of the pawl-lever, the rule-jointed prop for supporting the sliding poise, the horizontally-sliding bolt having a chain at one end attached to near the joint of the prop and formed with two outwardly-projecting blocks or lugs, a train of wheels in a clock-work, an eccentric disk fitted between the blocks and secured upon a shaft of the clock-work, a brake-wheel secured upon a shaft of the clock-work, a lever having a brake at one end and pivoted near its middle and having a spring for drawing it toward the ratchet-wheel and an armature at its lower end, a pair of magnets at the armature, and an open electric circuit having suitable keys for closing it, as and for the purpose shown and set forth.

In testimony that I claim the foregoing as my own I have hereunto affixed my signature in presence of two witnesses.

FRANK A. HINDS.

Witnesses:
J. ATWELL, Jr.,
SAM CHILD.